United States Patent [19]

Mizoguchi

[11] Patent Number: 5,406,390
[45] Date of Patent: Apr. 11, 1995

[54] HALF TONE IMAGE PROCESSING APPARATUS

[75] Inventor: Yoshito Mizoguchi, Yokohama, Japan

[73] Assignee: Canon Kabushiki Kaisha, Tokyo, Japan

[21] Appl. No.: 263,409

[22] Filed: Jun. 21, 1994

Related U.S. Application Data

[63] Continuation of Ser. No. 760,505, Sep. 16, 1991, abandoned.

[30] Foreign Application Priority Data

Sep. 18, 1990 [JP] Japan ................. 2-246152

[51] Int. Cl.⁶ ............................................. H04N 1/40
[52] U.S. Cl. ........................... 358/456; 356/455
[58] Field of Search ............ 358/75, 80, 406, 455, 358/456

[56] References Cited

U.S. PATENT DOCUMENTS

| | | | |
|---|---|---|---|
| 4,751,377 | 6/1988 | Ishizaka et al. | 250/205 |
| 4,864,419 | 9/1989 | Saito et al. | 358/456 |
| 4,870,506 | 9/1989 | Nakauchi | 358/296 |
| 4,882,621 | 11/1989 | Suzuki et al. | 358/80 |
| 4,888,636 | 12/1989 | Abe | 358/80 |
| 4,985,779 | 1/1991 | Gall | 358/456 |
| 5,028,991 | 7/1991 | Sekizawa et al. | 358/80 |

FOREIGN PATENT DOCUMENTS

| | | | |
|---|---|---|---|
| 269033 | 6/1988 | European Pat. Off. | G03G 15/01 |
| 3408336 | 9/1984 | Germany | H04N 1/40 |

*Primary Examiner*—Richard E. Chilcot, Jr.
*Assistant Examiner*—Rafael Bacares
*Attorney, Agent, or Firm*—Fitzpatrick, Cella, Harper & Scinto

[57] ABSTRACT

An image processing apparatus for processing a half tone image comprises: an input device to input an image signal; an image forming circuit to form an image onto a recording medium such as a photosensitive drum on the basis of the image signal supplied by the input device; a generator to generate a plurality of image data having different densities; a density detector to detect a density of the image formed on the recording medium by the image forming circuit on the basis of the image data generated from the generator; and a forming circuit to form a plurality of density conversion coefficients to convert the density of the image signal supplied by the input device on the basis of the densities of the plurality of images which are detected by the density detector.

10 Claims, 13 Drawing Sheets

HALF TONE IMAGE PROCESSING APPARATUS

This application is a continuation of application Ser. No. 07/760,505 filed Sep. 16, 1991, now abandoned.

BACKGROUND OF THE INVENTION

1. Field of the Invention

The invention relates to an apparatus for processing a half tone image.

2. Related Background Art

FIG. 17 shows a schematic construction of a laser beam printer.

Image data 1 is a digital signal of eight bits and shows light and dark states (256 gradations) of an image. As shown in FIG. 18, there is a linear relation between the light and dark information of the image and the gradations (0 to 255). For the digital image signal, an input density of 256 gradations is converted into an output density of 256 gradations by a density converter 2 on the basis of a lookup table system shown in FIG. 19. FIG. 20 shows the relation between the input density and the output density after conversion. The digital image signal is again converted into the analog signal by a D/A converter 6. The analog signal is compared with a signal of a predetermined period which is generated from a triangular wave generating circuit 8 by a comparator 7 and is pulse width modulated. The pulse width modulated binary image signal is directly supplied to a laser driving circuit 9 and is used as a signal to control on/off times of the light emission of a laser diode 10. A laser beam emitted from the laser diode 10 is scanned in the main scanning direction by a well-known polygon mirror 11 and passes through an f-θ lens 12 and is reflected by a reflecting mirror 13. The laser beam is subsequently irradiated onto a photo sensitive drum 14 which is rotating in the direction indicated by an arrow in FIG. 17, so that an electrostatic latent image is formed on the drum 14 as an image carrier.

On the other hand, the photo sensitive drum 14 is uniformly discharged by a pre-exposing device 16 before the laser beam is irradiated. Thereafter, the drum 4 is uniformly charged to the minus polarity by a charging device 15. Subsequently, the laser beam is irradiated onto the drum 14 and the electrostatic latent image corresponding to the image signals is formed on the surface of the drum 14.

Onto the portion of the photo sensitive drum 14 which has been discharged by the laser, a toner having a minus charging characteristic is deposited by a developing device 17 on the basis of a well-known inversion developing method. The portion on which the toner has been deposited is developed. A development image (toner image having minus charges) formed on the drum 14 is transferred onto a copy transfer material (generally, paper) 18 by a copy transfer charging device 19. After completion of the copy transfer, the remaining toner on the surface of the drum 14 is scraped off by a cleaner. The above series of processes are repeated again. A density of a final image on the copy transfer material which is formed by the above processes is determined in a one to one corresponding relation for the value of the digital image data which is generated from the density converter 2. That is, a light emitting time of the laser diode is specified in accordance with the value of the digital image data and a quantity of laser beam which is irradiated onto the drum 14 is decided. Further, an amount of toner which is developed, that is, an image density can be specified by causing a predetermined attenuation in a surface potential of the photo sensitive drum in accordance with the laser light quantity.

As shown in FIG. 21, the relation of the image density to the gradation of the digital image data which is generated is not linear but shows an S-shaped curve. Such S-shaped curve characteristics depend on a non-linearity of the sensitivity characteristic of the photo sensitive drum or the developing characteristic to the surface potential of the photo sensitive drum. The above characteristics are based on the characteristics of the conventional electrophotograph.

However, the relation of the final image density to the output image data shown in FIG. 21 is always unstable due to a difference of manufacturing lots of the photo sensitive drum or developing agents, a mechanical variation of the distance between the developing device and the photo sensitive drum, or an environmental durability dependency of the photo sensitive drum or developing agent. Thus, there is a problem such that the gradation of the reproduced image is not good.

To solve the above problems, therefore, a method disclosed in U.S. Pat. No. 4,888,636 has been considered. According to the above method, density of a toner image formed on the photo sensitive drum is measured and characteristics of the output image data and the image density are changed in accordance with the result of the measurement.

According to U.S. Pat. No. 4,888,636, however, a plurality of tables showing the characteristics of the output image data and the image densities are prepared and a proper table is selected in accordance with the result of the measurement. Thus, there is a problem such that the characteristics of the photo sensitive material do not completely correspond to the data in the table and fine control is difficult.

SUMMARY OF THE INVENTION

It is an object of the invention to provide an image processing apparatus and an image processing method which can solve the foregoing drawbacks.

Another object of the invention is to provide an image processing apparatus and an image processing method in which an image is formed onto a recording medium, a density of the formed image is measured, and a density conversion coefficient is formed in accordance with the result of the measurement, thereby obtaining an image of a good gradation.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will be described in detail hereinbelow with reference to the drawings.

Figure 1:
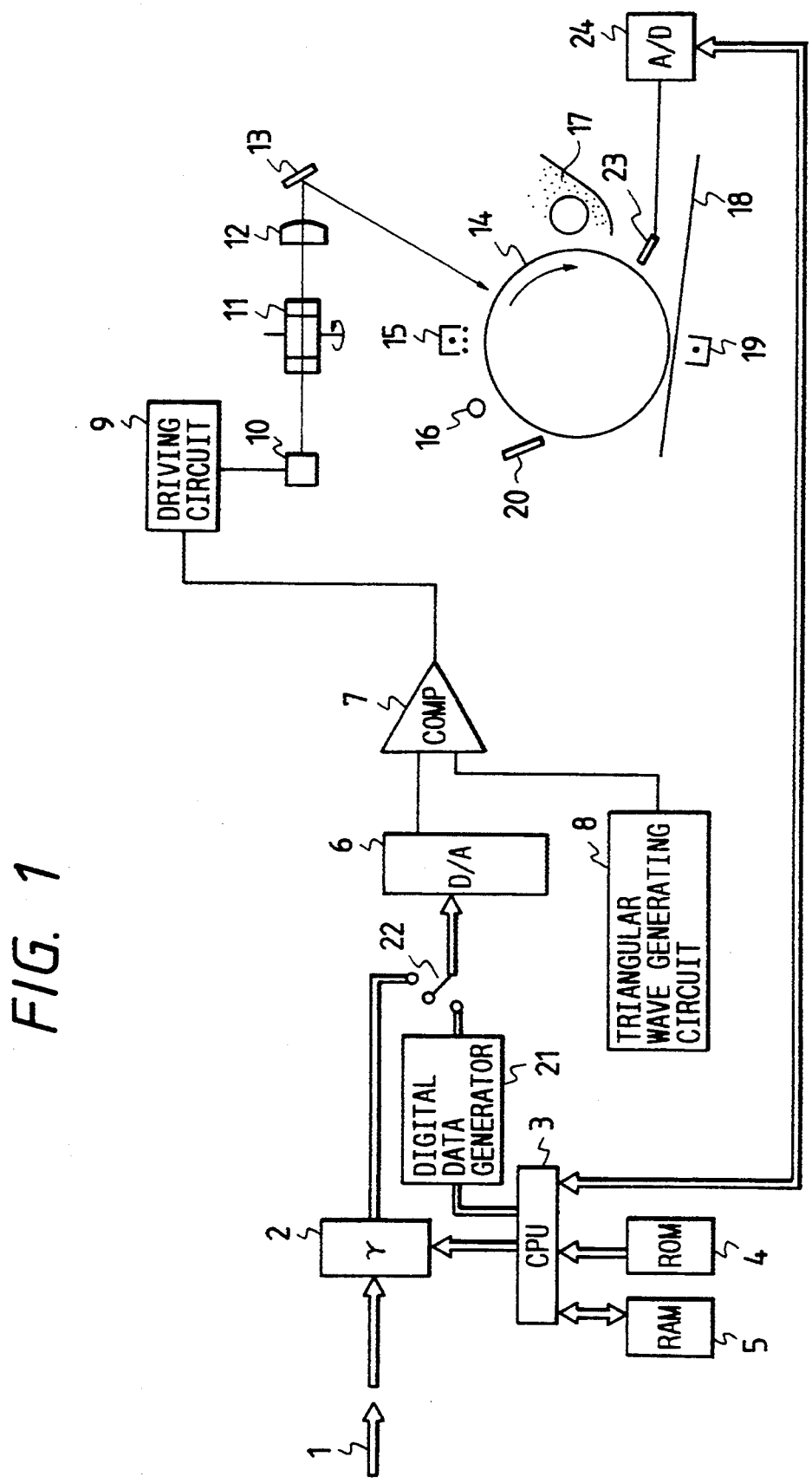
FIG. 1 is a block diagram showing the first embodiment of the invention.

FIG. 1 shows the first embodiment of the invention and shows an example of a laser beam printer.

Figure 2:
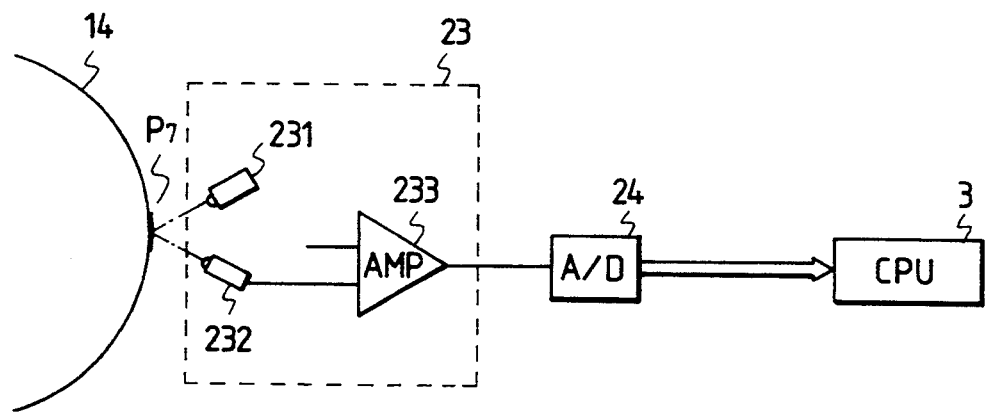
FIG. 2 is a block diagram showing a construction of a light quantity detecting apparatus shown in FIG. 1.
Figure 17:
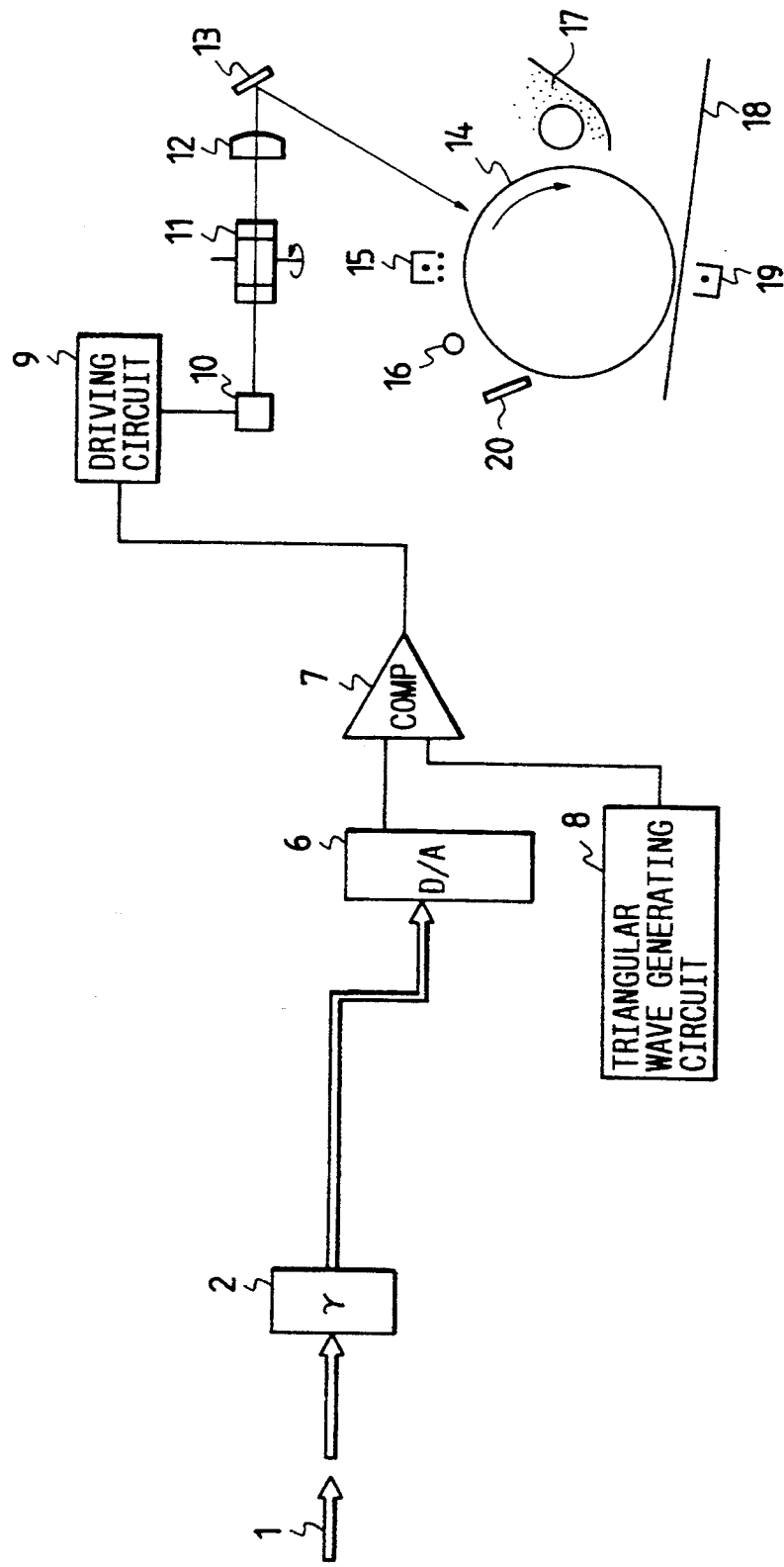
FIG. 17 is a block diagram showing a conventional image forming apparatus.

In the diagram, reference numerals 1, 2, and 6 to 20 designate the same portions as those shown in FIG. 17. Reference numeral 5 denotes an RAM in which 17 digital data of 0, 16, 32, 48, . . . , 240, and 255 have been stored. Reference numeral 4 denotes an ROM in which a control program has been stored and 21 indicates a digital data generator for generating digital data of different gradations on the basis of 17 digital data of 0, 16, 32, 48, . . . , 240, and 255 stored in the RAM 5. Reference numeral 22 denotes a bus switch for switching an input device to either one of the digital data generator 21 and the density converter 2 and 23 indicates a light quantity detecting apparatus comprising: a laser diode 231 as a light emitting device; a photo diode 232 as a photo sensitive device; and an amplifier 233 as shown in FIG. 2. The light quantity detecting apparatus 23 detects a reflection light quantity from a visible image (hereinafter, referred to as a patch) formed on the photo sensitive drum 14. A wave length of a laser beam which is emitted from the laser diode 231 is set to 960 nm. Since a sensitivity of the drum 14 lies within a range from 780 to 800 nm, the drum 14 is hardly influenced by the laser beam. An A/D converter 24 converts an analog signal from the light quantity detecting apparatus 23 into a digital signal. Reference numeral 3 denotes a CPU serving as correcting means for correcting a density conversion coefficient of the density converter 2 in accordance with the density detected by the light quantity detecting apparatus 23.

The density correcting principle in the embodiment will now be described.

Figure 3:
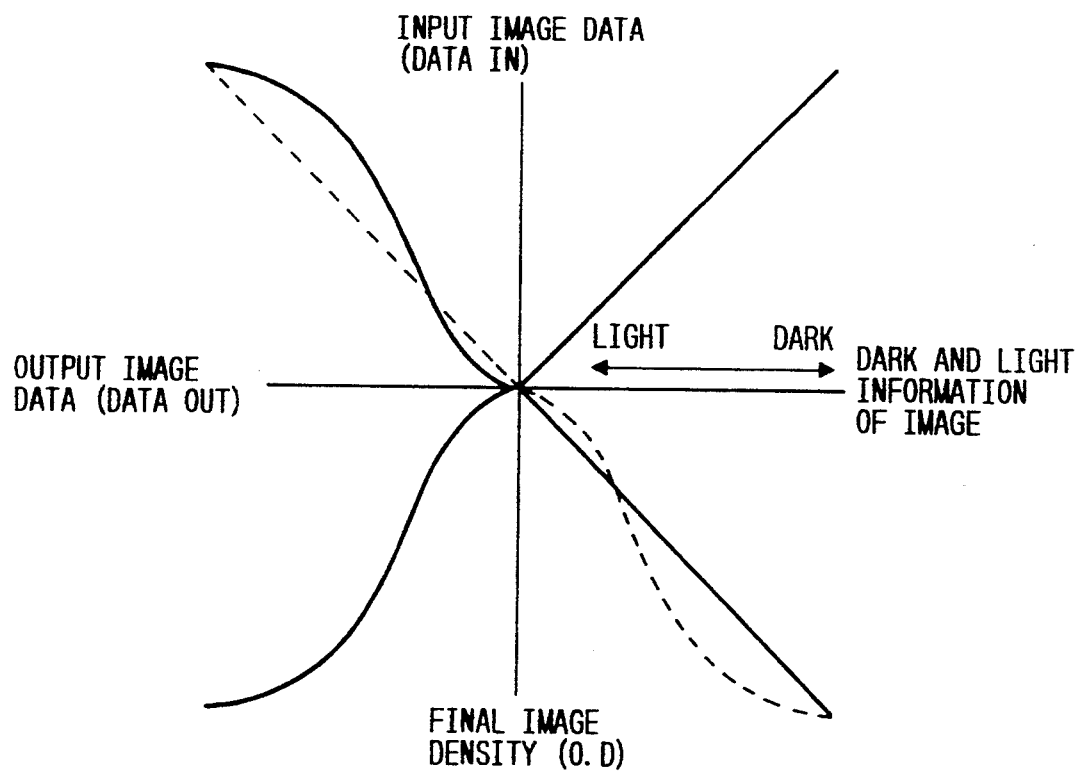
FIG. 3 is a diagram which sensitometrically expresses FIGS. 18, 20, and 21.
Figure 18:
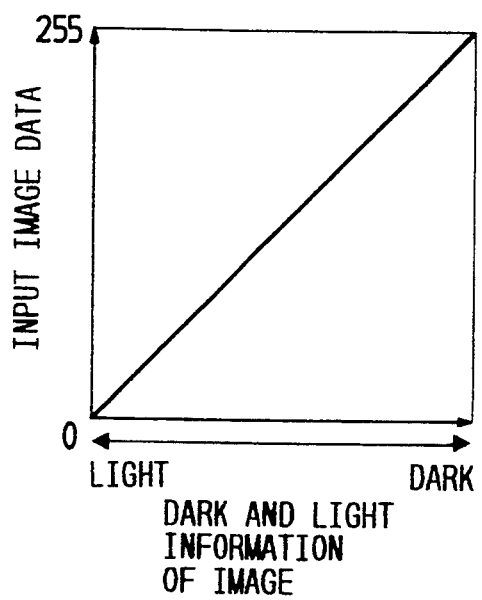
FIG. 18 is a diagram showing values of digital data which are sent to the image forming apparatus on the basis of light and dark information of an image.
Figure 20:
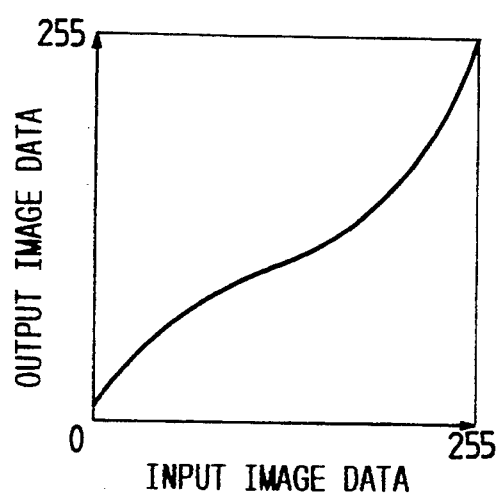
FIG. 20 is a diagram showing the relation of the output image data to the input image data, that is, the density converting function.
Figure 21:
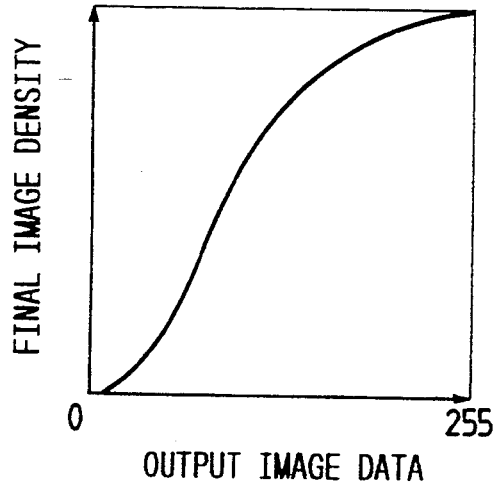
FIG. 21 is a diagram showing the relation of the final image density to the output image data, that is, the electrophotograph characteristics in the digital image processing apparatus.
Figure 19:
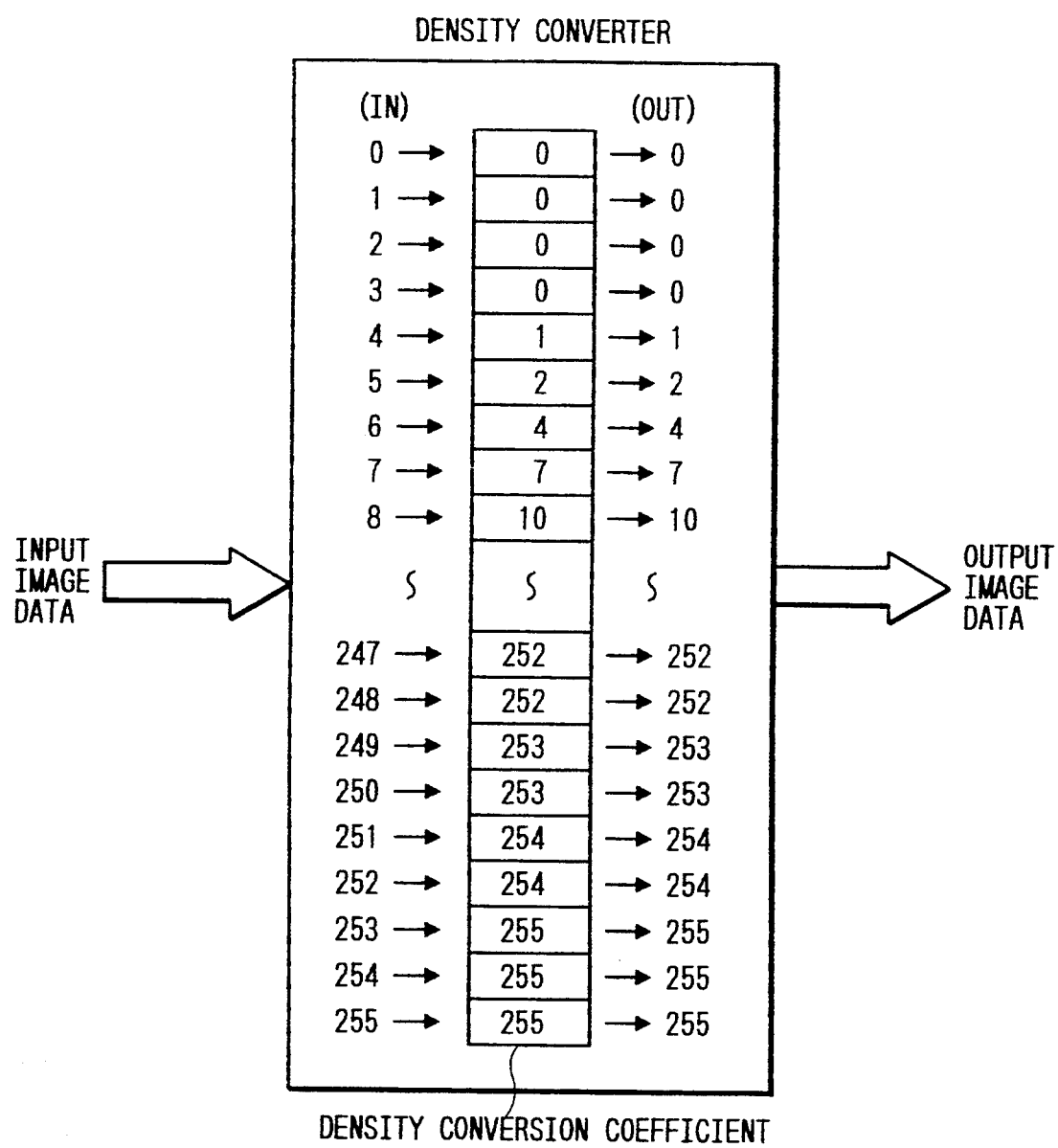
FIG. 19 is an explanatory diagram for explaining the operation of a density converter.

In the embodiment, the output characteristics which have been made non-linear due to the non-linearity of the photo sensitive characteristics of the photo sensitive drum or the developing characteristics to the surface potential of the photo sensitive drum are made linear. That is, when characteristic diagrams shown in FIGS. 18, 20, and 21 are sensitometrically arranged into the first, second, and third quadrants as shown in FIG. 3, respectively, it will be understood that the final image density to the image light/dark information in the fourth quadrant has a linear characteristic. By obtaining such linear characteristics as mentioned above, an image of a good gradation reproducibility can be obtained.

When the density conversion curve of the second quadrant is set to a straight line as shown by a broken line in FIG. 3 (such a process is equivalent to that the density is not converted), a density conversion curve of the fourth quadrant is not linear as shown by a broken line in FIG. 3. It will be understood from the above explanation that the density conversion curve shown in FIG. 20, namely, the input/output characteristics of the density converter 2 are determined as an inverse function of the curve shown by a broken line in the fourth quadrant.

A method of deciding the density conversion coefficient will now be described.

Assuming that a digital reflection light quantity from a patch $P_0$ of the lowest density is set to $E_{p0}$ and a digital reflection light quantity from a patch $P_n$ is set to $E_{pn}$, a patch density $D_n$ of the patch $P_n$ is expressed by the following equation.

$$D_n = -\log_{10}(E_{pn}/E_{p0})$$

Figure 4:
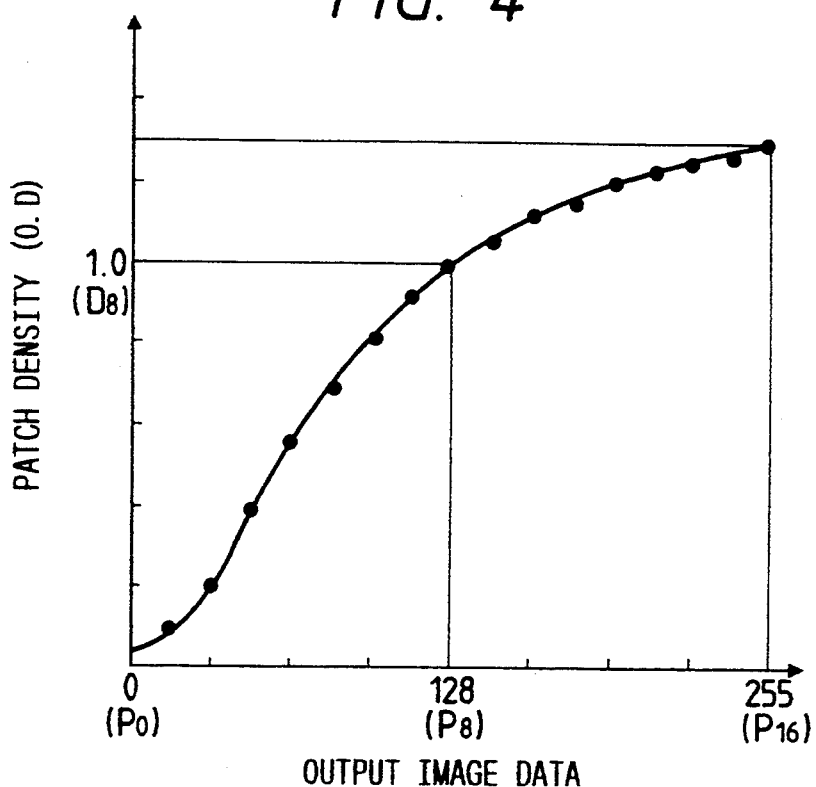
FIG. 4 is a diagram showing the relation of a patch density to output image data.
Figure 5:
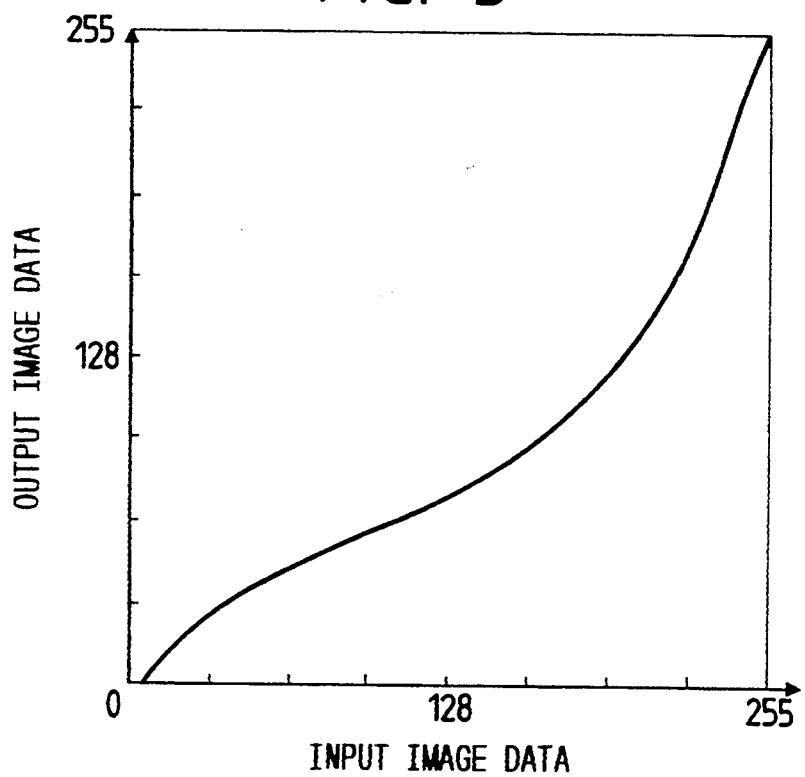
FIG. 5 is a diagram showing the relation of output image data to input image data.

FIG. 4 shows the relation of the patch densities $D_0$ to $D_{16}$ to the patches $P_0$ to $P_{16}$. The above relation corresponds to the relation of the density to the output image data which is shown by the broken line in the fourth quadrant in FIG. 3. Therefore, an inverse function of the function shown in FIG. 4 is obtained. That is, an axis of abscissa and an axis of ordinate shown in FIG. 4 are exchanged, the patch density is standardized to 0 to 255, and the data is linearly interpolated. FIG. 5 shows a function obtained as mentioned above.

Figure 6:
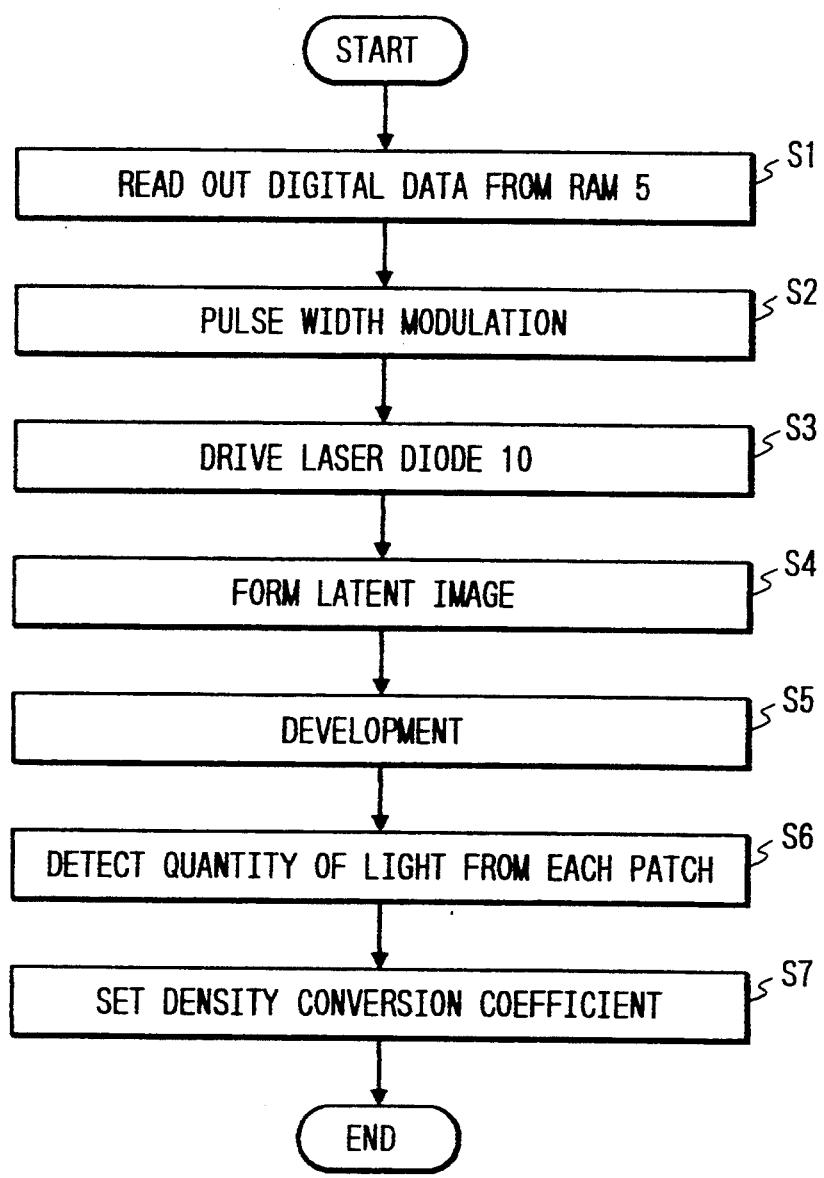
FIG. 6 is a flowchart showing a control procedure which is stored into an ROM 4 shown in FIG. 1.

FIG. 6 is a flowchart showing the control procedure stored in the ROM 4 in FIG. 1.

Figure 7:
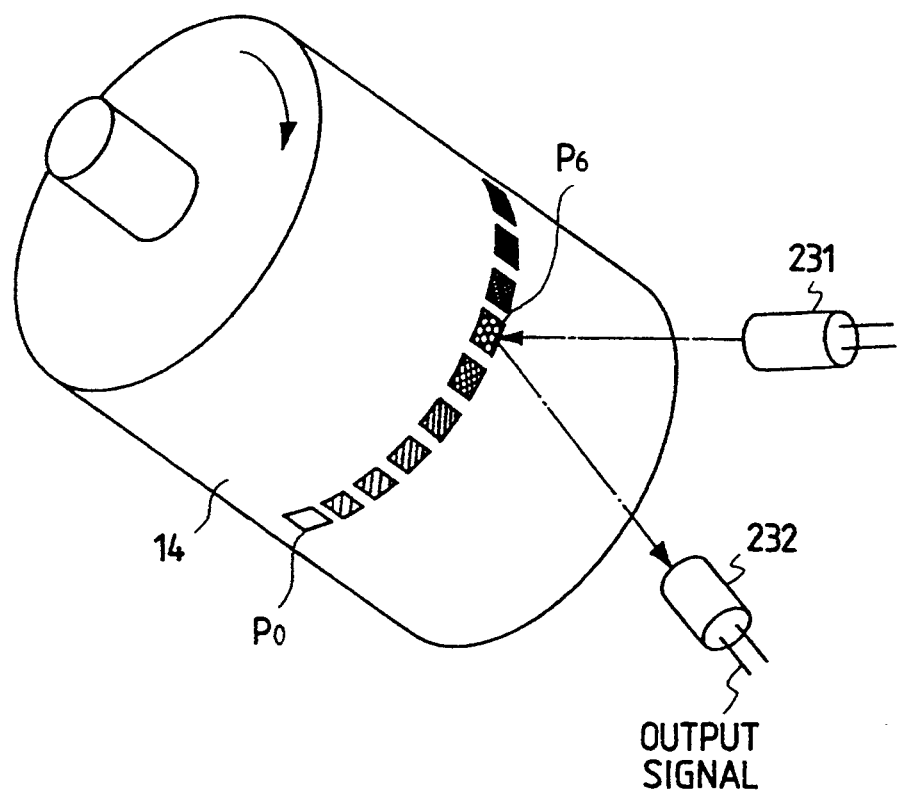
FIG. 7 is a diagram showing a state of the measurement of a reflection light quantity of an image formed on a photo sensitive material.

The bus switch 22 is switched to the side of the digital data generator 21. The polygon mirror 11 and the photo sensitive drum 14 are subsequently rotated. After that, in step S1, 17 digital data of the levels 0, 16, 32, 48, . . . , 240, and 255 are read out of the RAM 5. The read-out digital data is converted into the analog signal by the D/A converter 6. In step S2, the analog signal is compared with a signal from a triangular wave generating circuit 8 by the comparator 7 and a pulse width modulation is performed. In step S3, the laser driving circuit 9 drives the laser diode 10 on the basis of the pulse width modulated binary image signal. In step S4, the laser beam emitted from the laser diode 10 is scanned in the main scanning direction by the polygon mirror 11 and passes through the f-θ lens 12 and is reflected by the reflecting mirror 13. The reflected laser beam is irradiated onto the photo sensitive drum (or recording medium) 14, so that latent images are sequentially formed on the drum 14 in correspondence to the image output levels. In step S5, the formed latent images are developed by the developing device 17. FIG. 7 shows patches formed on the drum 14.

A size of patch which is formed on the drum 14 is set to a size such that it is larger than a diameter of a light spot which is formed by the light flux from the laser diode 231 onto the drum 14 and the signal which is received by the photo diode 232 becomes sufficiently stable. For instance, assuming that a distance between the laser diode 231 and the drum 14 is set to 5 mm, it is preferable to set the size of patch to 20 mm×20 mm. If the size of patch is set to a larger value than it is needed, an amount of toner which is consumed increases, so that such a large patch size is unpreferable.

Figure 8:
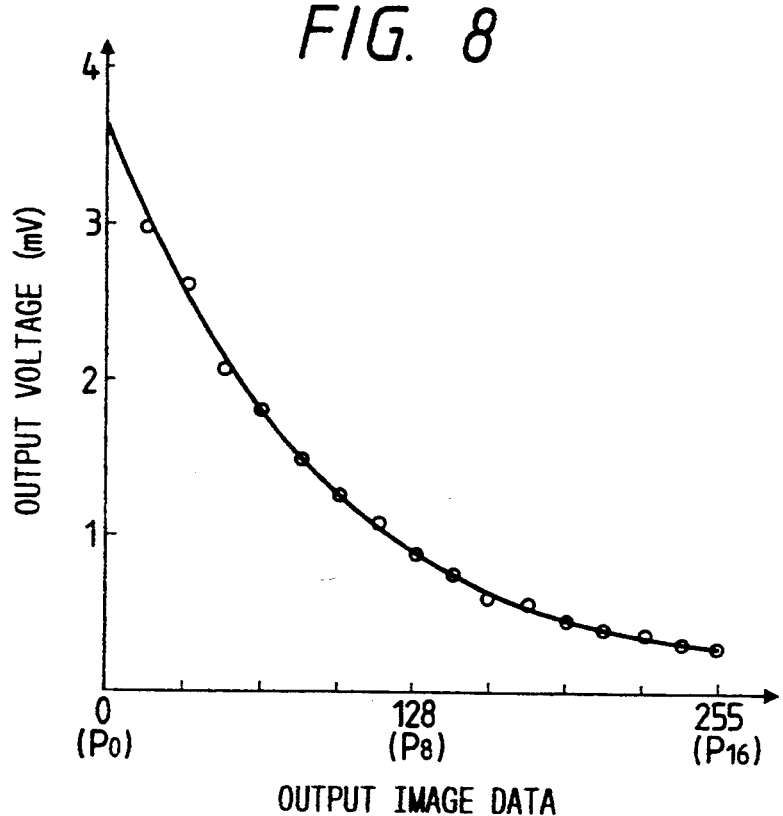
FIG. 8 is a diagram showing the relation of an output voltage to output image data which has been measured by a reflection density measuring apparatus.
Figure 9:
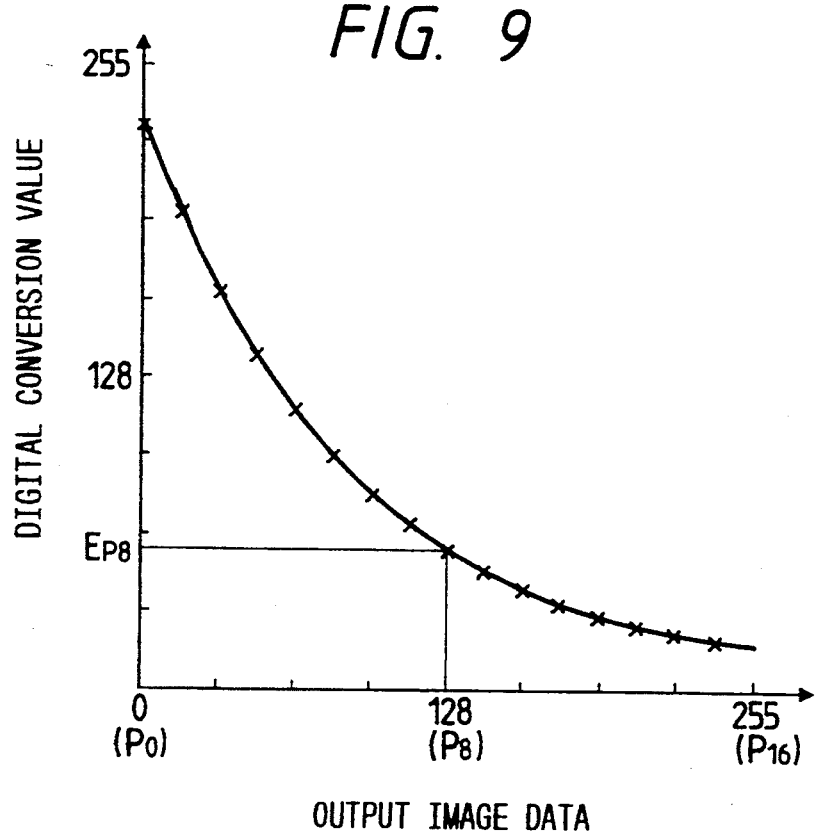
FIG. 9 is a diagram showing the relation of an output voltage to output image data in the case where the output voltage shown in FIG. 4 has been converted into the digital values.

In step S6, a light quantity from each patch is detected. The detecting timing of the light quantity detecting apparatus 23 to the signal generating timing of the digital data generator 21 is deviated by only the time interval from a time point when the drum 14 is exposed until a time point when the patch faces the light quantity detecting apparatus 23. For instance, when the light quantity detecting apparatus 23 faces the patch $P_6$ as shown in FIG. 7, the light emitted from the laser diode 231 toward the drum 14 is reflected by the patch $P_6$. The light reflected by the patch $P_6$ is detected by the photo diode 232. An output voltage from the photo diode 232 is amplified by the amplifier 233. FIG. 8 shows an example of output voltages of the amplifiers 233 corresponding to the digital data 0, 16, 32, 48, ..., 240, and 255. The output voltages are converted into 8-bit digital signals $E_{p0}$ to $E_{p16}$ by the A/D converter 24 for the patches $P_0$ to $P_{16}$, respectively, and are stored into the RAM 5. FIG. 9 shows the relation between the output image data and the converted digital values. In step S7, 256 density conversion coefficients are obtained by the linear interpolation and are set into an RAM provided in the density converter 2. After completion of the above processes, the bus switch 22 is switched to the side of the density converter 2. Upon image formation, the densities are converted on the basis of the set density conversion coefficients.

In the embodiment, an example in which the density conversion coefficients are determined every start of the image formation has been described. However, the timing to decide the density conversion coefficients is not limited to the above timing but can be also arbitrarily set. For instance, such a timing can be also set to either one of the timing when a main switch is turned on, the timing after the elapse of a predetermined time from the turn-on of the main switch, and the timing when a maintenance and an inspection of the image forming apparatus are executed.

(Second embodiment)

Figure 10:
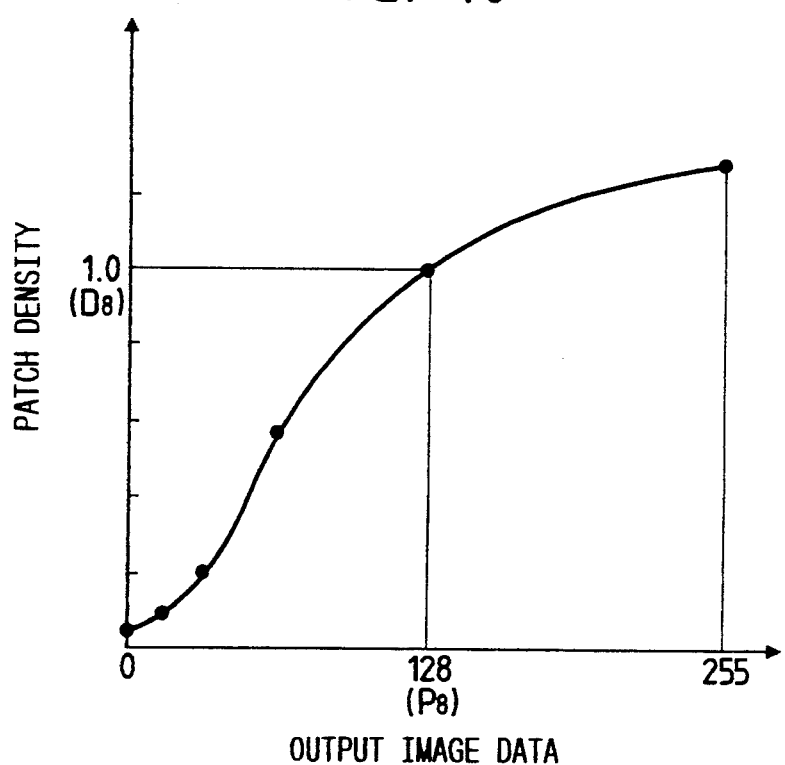
FIG. 10 is a diagram showing the relation of a final image density to the output image data, that is, electrophotographic characteristics in a digital image forming apparatus.
Figure 11:
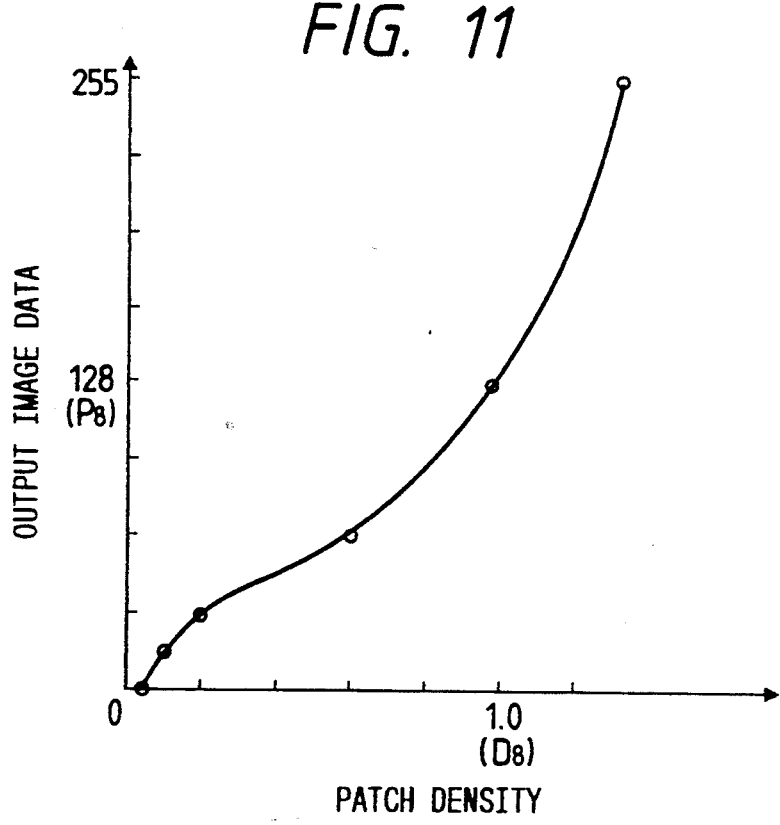
FIG. 11 is a diagram which is obtained in the case where an axis of abscissa and an axis of ordinate shown in FIG. 14 have been replaced.
Figure 12:
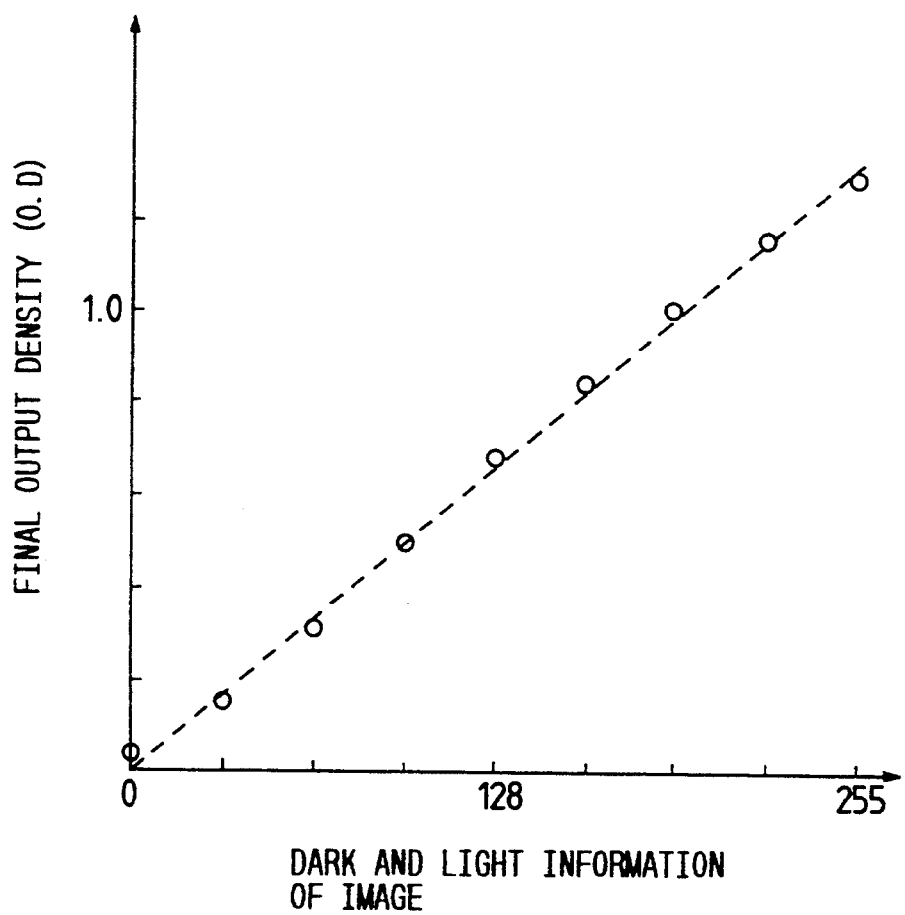
FIG. 12 is a diagram showing final output characteristics which have been gradation corrected.

When comparing with the first embodiment, the number of reference data in the second embodiment differs from that in the first embodiment. In the first embodiment, the number of levels has been set to 17 levels of 0, 16, 32, 48, ..., 240, and 255. However, in the second embodiment, the number of levels is set to six levels of 0, 16, 32, 64, 128, and 256. In such a case, the relation of the patch density to the output image data is as shown in FIG. 10. Therefore, an axis of abscissa and an axis of ordinate shown in FIG. 10 are exchanged, thereby obtaining an approximate curve shown in FIG. 11. To smoothly connect six points, it is proper to approximate by a cubic function. In the case of using the approximate curve shown in FIG. 11, gradation characteristics of the image formed by the laser beam printer are as shown in FIG. 12. As will be understood from FIG. 12, although an error occurs due to the approximation, there is no practical problem.

Since the second embodiment has been constructed as mentioned above, as compared with the first embodiment, the processing time of the patch is reduced, an amount of toner which is consumed is decreased, and deteriorations of the durability and life due to the rotation of the drum can be reduced.

(Third embodiment)

Figure 13:
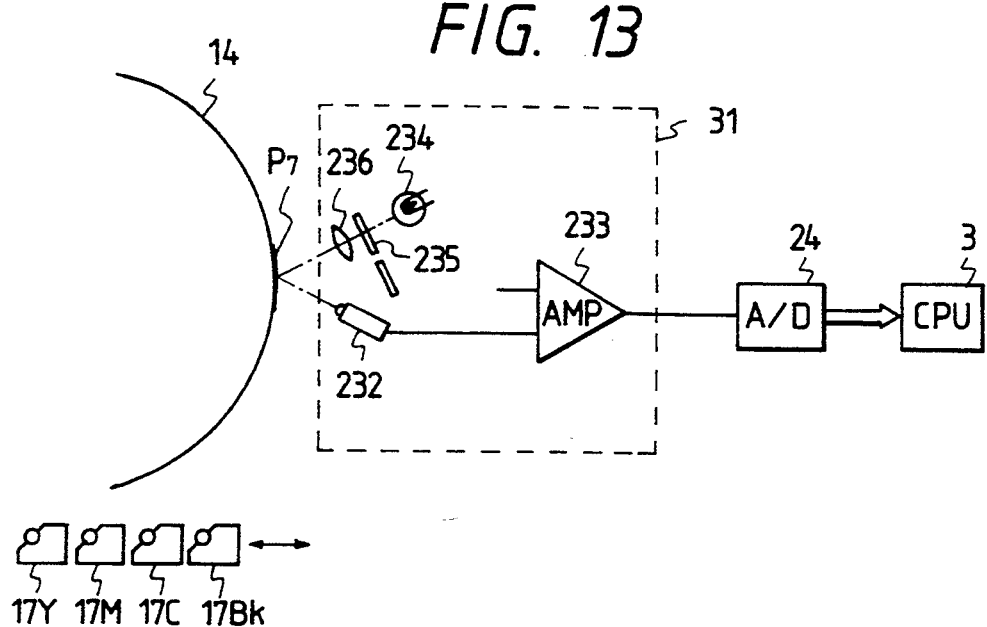
FIG. 13 is a block diagram showing the third embodiment of the invention.
Figure 14:
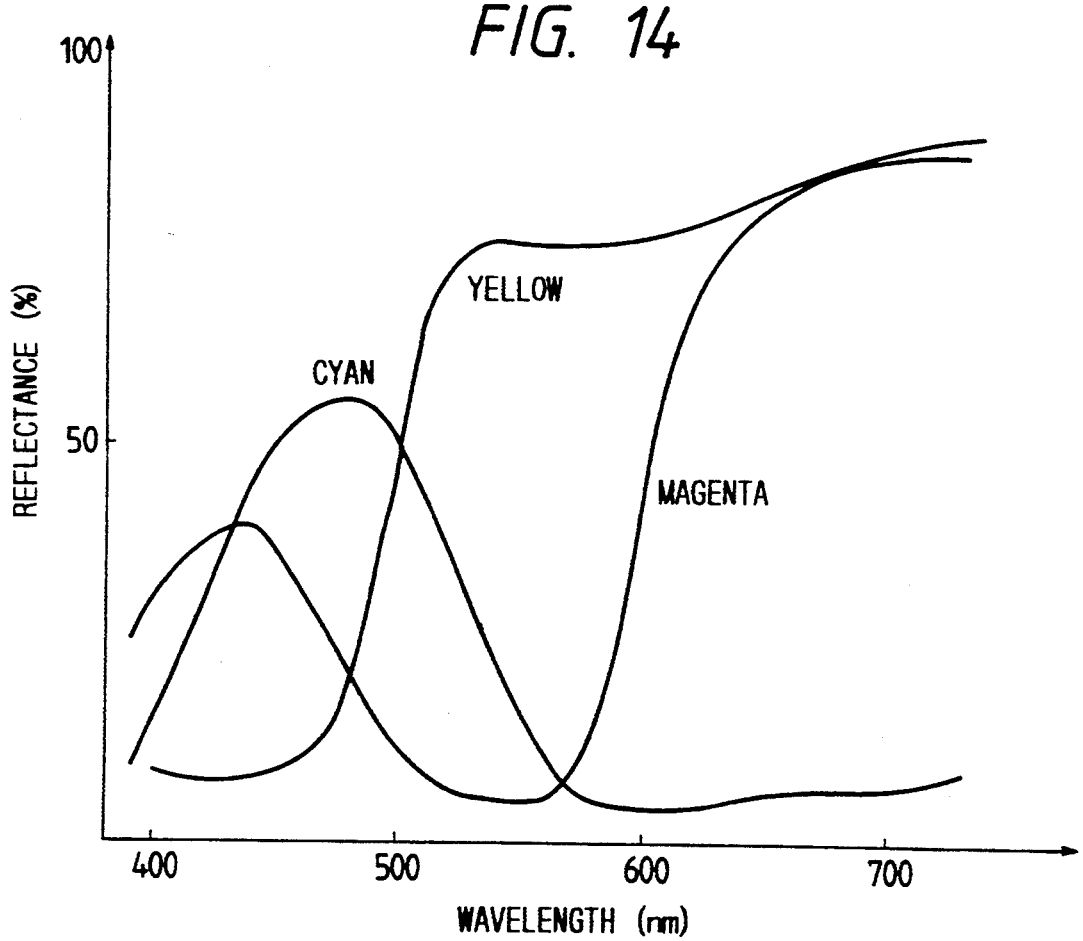
FIG. 14 is a diagram showing an example of a spectral reflectance of a color toner.
Figure 15:
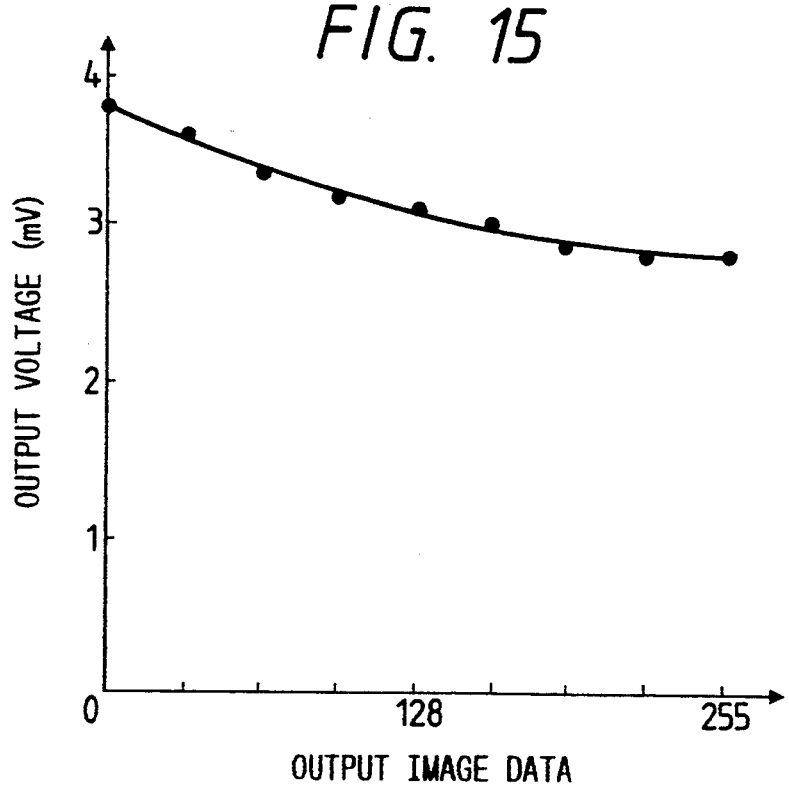
FIG. 15 is a diagram showing the relation of the output voltage to the output image data which has been measured by a reflection density measuring apparatus.

FIG. 13 shows the third embodiment of the invention and shows an example of a color image forming apparatus having four developing devices 17Y, 17M, 17C, and 17Bk containing toners of yellow, magenta, cyan, and black, respectively. Patches of the magenta, cyan, and yellow toners are formed by the color image forming apparatus. Patches of a plurality of densities are formed every color. FIG. 14 shows spectral characteristics of each color. A light quantity detecting apparatus 31 in the embodiment comprises a lamp 234, a spectral filter 235, a lens 236, the photo diode 232, and the amplifier 233. A white light irradiated from the lamp 234 is spectrally separated by the spectral filter 235 and is converged by the lens 236. After that, the converged light is irradiated onto the patch formed on the photo sensitive drum 14. The light reflected from the patch is detected by the photo diode 232.

The reason why the lamp 234 is used is because a spectral distribution of magenta or yellow has characteristics such that the infrared ray (960 nm) is reflected and a change amount of the reflection light quantity is very small. In the case of using a laser diode having a peak wave length in a range of the infrared ray (960 nm), a wide dynamic range of the reflection light quantity cannot be obtained with respect to either one of the three color toners and the patch density cannot be accurately measured.

Figure 16:
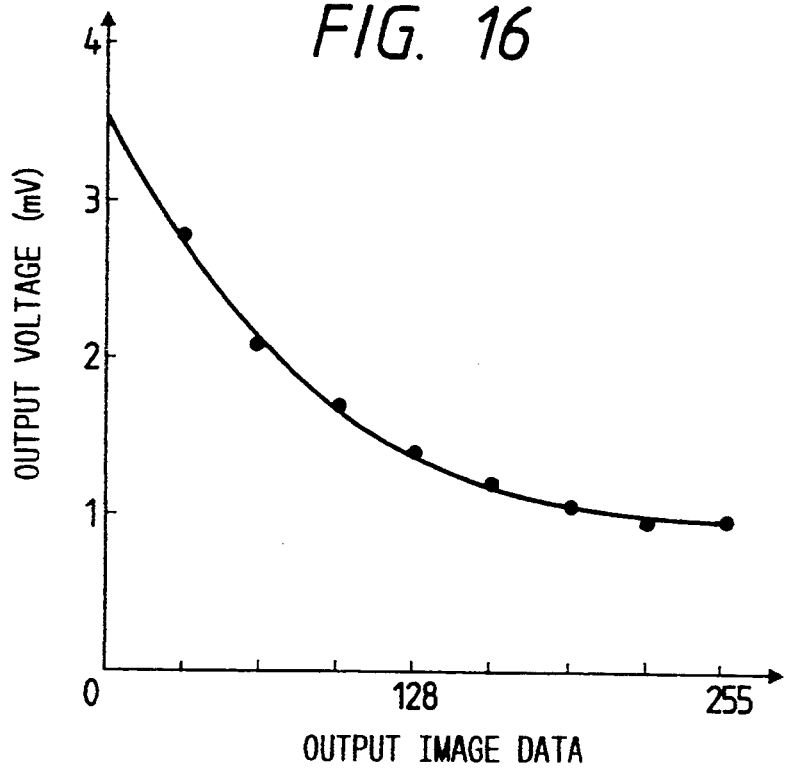
FIG. 16 is a diagram showing the relation of the output voltage to the output image data which has been measured by the reflection density measuring apparatus.

In the case of measuring the reflection light quantity of the magenta patch, the spectral filter 235 is switched to the green filter. In the case of measuring the reflection light quantity of the yellow patch, the filter 235 is switched to the blue filter. In the case of measuring the reflection light quantity of the cyan patch, the filter 235 is switched to the red filter. FIG. 16 shows a dynamic range of the reflection light quantity in the above case.

In the third embodiment, a method of forming the density conversion coefficients of each color is similar to that in the first embodiment, so that an operation and an effect which are substantially similar to those in the first embodiment are derived.

The invention is not limited to the case of using the patches of the magenta, yellow, and cyan toners but it is also possible to construct in a manner such that the density of the patch of the black toner is measured as in the first embodiment and the density conversion coefficients of four colors are formed.

In addition, the present invention can be applicable to a black-and-white printer, a black-and-white duplicator, a color printer, a color duplicator and an image pickup apparatus which uses an electronic photograph system or a thermal transfer system etc.

What is claimed is:

1. An image processing apparatus comprising:

input means for inputting a color image signal;

image forming means for forming color images by applying developing agents of a plurality of colors onto a reusable recording medium on the basis of the color image signal supplied from the input means;

transfer means for transferring the color image formed on the recording medium to a recording sheet;

generating means for generating a plurality of image data having different densities;

density detecting means for detecting densities of the color image formed on the recording medium by said image forming means; and control means for controlling said generating means and said image forming means and said density detecting means so as to cause said generating means and said image forming means and said density detecting means to form images of a plurality of different densities of a predetermined color and to detect densities of each formed image, wherein said control means produces a plurality of conversion coefficients for correcting input-output characteristics of densities of the image signal supplied to said input means, on the basis of the densities of each image detected by said density detecting means, and causes a memory to store the produced conversion coefficients, and wherein said control means produces the conversion coefficients for each of said plurality of colors.

2. An apparatus according to claim 1, wherein said generating means sequentially generates a plurality of image data having different densities.

3. An image processing method in an image forming apparatus having input means for inputting a color image signal and image forming means for forming color images by applying developing agents of a plurality of colors onto a reusable recording medium on the basis of the color image signal supplied by said input means, and transfer means for transferring the color image formed on the recording medium to a recording sheet, comprising the steps of:

a) forming images of a plurality of different densities of a predetermined color on the recording medium by the image forming means on the basis of a plurality of image data having different predetermined densities;

b) detecting densities of the plurality of images formed on the recording medium in said forming step, respectively;

c) producing a plurality of conversion coefficients for correcting input-output characteristics of densities of the image signal supplied to said input means, on the basis of densities of each image detected in said detection step;

d) storing the plurality of conversion coefficients produced in said producing step into a memory; and e) repeating said forming, detecting, producing and storing steps for each of said plurality of colors.

4. A color image forming apparatus comprising:

input means for inputting a color image signal;

image forming means for forming a color image on the basis of the color image signal which is supplied by said input means, said image forming means having a plurality of developing means respectively containing agents of yellow, magenta, cyan and black;

generating means for generating a plurality of image data having different densities;

density detecting means for detecting a density of images formed by said image forming means; and control means for controlling said generating means and said image forming means and said density detecting means so as to cause said generating means and said image forming means and said density detecting means to form images of a plurality of different densities as to each of yellow, magenta, cyan and black on a single recording medium and to detect densities of the images of each color formed on said single recording medium, wherein said control means produces a plurality of conversion coefficients for correcting input-output characteristics of densities of the image signal supplied to said input means, on the basis of densities of a plurality of images for each of yellow, magenta, cyan and black detected by said density detecting means.

5. An apparatus according to claim 1, wherein said recording medium is a drum-shaped photosensitive medium.

6. An apparatus according to claim 1, wherein said image forming means comprises latent image forming means for forming a latent image on said recording medium and a plurality of developing means including the developing agents for each different color, for developing the latent image.

7. An apparatus according to claim 3, wherein said recording medium is a drum-shaped photosensitive medium.

8. An apparatus according to claim 3, wherein said image forming means comprises latent image forming means for forming a latent image on said recording medium and a plurality of developing means including the developing agents for each different color, for developing the latent image.

9. An apparatus according to claim 4, wherein said recording medium is used repeatedly to form the plurality of images.

10. An apparatus according to claim 9, wherein said recording medium is a drum-shaped photosensitive medium.

* * * * *